(12) United States Patent
Tung

(10) Patent No.: US 6,168,446 B1
(45) Date of Patent: Jan. 2, 2001

(54) ELECTRONIC CARD CONNECTOR HAVING AN IMPROVED CARD RELEASE MECHANISM

(75) Inventor: Shun-Chi Tung, Tu-Chen (TW)

(73) Assignee: Hon Hai Precision Ind. Co., Ltd., Taipei Hsien (TW)

( * ) Notice: Under 35 U.S.C. 154(b), the term of this patent shall be extended for 0 days.

(21) Appl. No.: 09/324,607

(22) Filed: Jun. 2, 1999

(30) Foreign Application Priority Data

Sep. 25, 1998 (TW) ................................................ 87215986

(51) Int. Cl.⁷ .................................................. H01R 13/62
(52) U.S. Cl. ......................................... 439/159; 439/924.1
(58) Field of Search ..................................... 439/157, 159, 439/160, 607, 924.1, 79

(56) References Cited

U.S. PATENT DOCUMENTS

| | | | |
|---|---|---|---|
| 5,197,895 | * 3/1993 | Koike | 439/159 |
| 5,286,207 | * 2/1994 | McHugh | 439/79 |
| 5,421,737 | * 6/1995 | Chen et al. | 439/157 |
| 5,536,180 | * 7/1996 | Ishida et al. | 439/159 |

* cited by examiner

*Primary Examiner*—Neil Abrams
*Assistant Examiner*—Javaid Nasri
(74) *Attorney, Agent, or Firm*—Wei Te Chung

(57) ABSTRACT

An electronic card connector adapted to mount to a circuit board and receive and electrically connect an electronic card to the circuit board includes an insulative header having a board facing side. Long and short contact terminals are received and retained in the header with tail ends thereof extending beyond the board facing side to electrically engage with the circuit board. The board facing side of the header has a recess defined therein corresponding to each of the long contact terminals. The recess has a depth sufficient to accommodate the difference of length between the long and short contact terminals thereby reducing the overall dimension of the connector. The electronic card connector includes a card release mechanism for ejecting the electronic card from the connector. The card release mechanism includes a card release bar that is movable with respect to the header to pivot an actuator which in turn drives the electronic card out of the connector. The header has an arm extending therefrom with a groove defined therein for guidingly receiving and supporting a front end of the card release bar. The electronic card connector has a casing enclosing the header. The casing has an inner side wall and an outer side wall defining a channel therebetween for guidingly and movably receiving a rear section of the card release bar thereby more securely supporting the card release bar with respect to the header.

6 Claims, 4 Drawing Sheets

ELECTRONIC CARD CONNECTOR HAVING AN IMPROVED CARD RELEASE MECHANISM

BACKGROUND OF THE INVENTION

1. Field of the Invention

The present invention generally relates to an electronic card connector, and in particular to an electronic card connector which performs a smooth card release operation and occupies a limited space.

2. The Prior Art

The dimension of a computer is becoming increasingly smaller but the performance thereof is becoming more sophisticated. To support the improved functional capabilities thereof, a computer is often equipped with an electronic card connector for releasably connecting an electronic card, such as a memory card, for expanding the resources of the computer.

FIG. 1 of the attached drawings shows an example of the electronic card connector that is designated by reference numeral 1. The electronic card connector 1 comprises an insulative header 11 having a terminal receiving section 111 which forms a card facing side 112 and a board facing side 113. Contact terminals 14 are received and retained in the terminal receiving section 111 having one end extending beyond the card facing side 112 for engaging with an electronic card (not shown) and an opposite end extending beyond the board facing side 113 for being mounted to a circuit board (not shown). Two guide rails 131 are attached to the header 11 at opposite sides of the terminal receiving section 111 thereby defining a space therebetween for receiving the electronic card.

A card release mechanism 13 comprises a card release bar 132 which is movably disposed outside one of the guide rails 131 and guided by guiding members 1311 mounted to the guide rail 131. An actuator 133 is pivotably engaged with a retainer plate 12 or the header 11, and an end of the actuator 133 is coupled to the card release bar 132 and an opposite end is pivotably connected to an ejection plate 134. In operation, when the card release bar 132 is moved inward, the actuator 133 is pivoted and drives the ejection plate 134 outward thereby forcing an electronic card out of the card connector. Examples of such conventional electronic card connectors are disclosed in Taiwan patent application Nos. 84210015, 85208532 and 86204066.

A problem associated with the conventional electronic card connector is that the guiding members 1311 for the card release bar 132 are basically arranged on the guide rail 131 thus the front end of the card release bar 132 that is coupled to the actuator 133 is unsupported. Therefore, the card release bar 132 may be deflected and damage the electronic card connector or the bar may become lodged in the connector.

Furthermore, the electronic card connector usually comprises contact terminals having three different sizes (lengths), namely 3.5 mm, 4.25 mm and 5 mm. The overall dimension of the electronic card connector must be large enough to accommodate the different sizes of the contact terminals. Thus, reduction of the overall dimension of the connector cannot be promoted.

It is thus desirable to have an electronic card connector that overcomes the above-discussed problems of the prior art.

SUMMARY OF THE INVENTION

Accordingly, an object of the present invention is to provide an electronic card connector having a stably supported card release bar for providing a smooth card release operation.

Another object of the present invention is to provide an electronic card connector having a header which can accommodate an extra length of contact terminals received therein thereby reducing the overall dimension of the connector.

To achieve the above objects, an electronic card connector in accordance with the present invention is adapted to be mounted to a circuit board and receive and electrically connect an electronic card to the circuit board. The electronic card connector comprises an insulative header having a board facing side. Long and short contact terminals are received and retained in the header with tail ends thereof extending beyond the board facing side to electrically engage with the circuit board. The board facing side of the header has a recess defined therein corresponding to each of the long contact terminals. The recess has a depth sufficient to accommodate the difference of length between the long and short contact terminals, thereby reducing the overall dimension of the connector. The electronic card connector comprises a card release mechanism for releasing the electronic card from the connector. The card release mechanism comprises a card release bar that is movable with respect to the header to pivot an actuator that drives the electronic card out of the connector. The header has an arm extending therefrom with a groove defined therein for guidingly receiving and supporting a front end of the card release bar. The electronic card connector has a casing enclosing the header. The casing has an inner side wall and an outer side wall defining a channel therebetween for guidingly and movably receiving a rear section of the card release bar thereby more securely supporting the card release bar with respect to the header.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
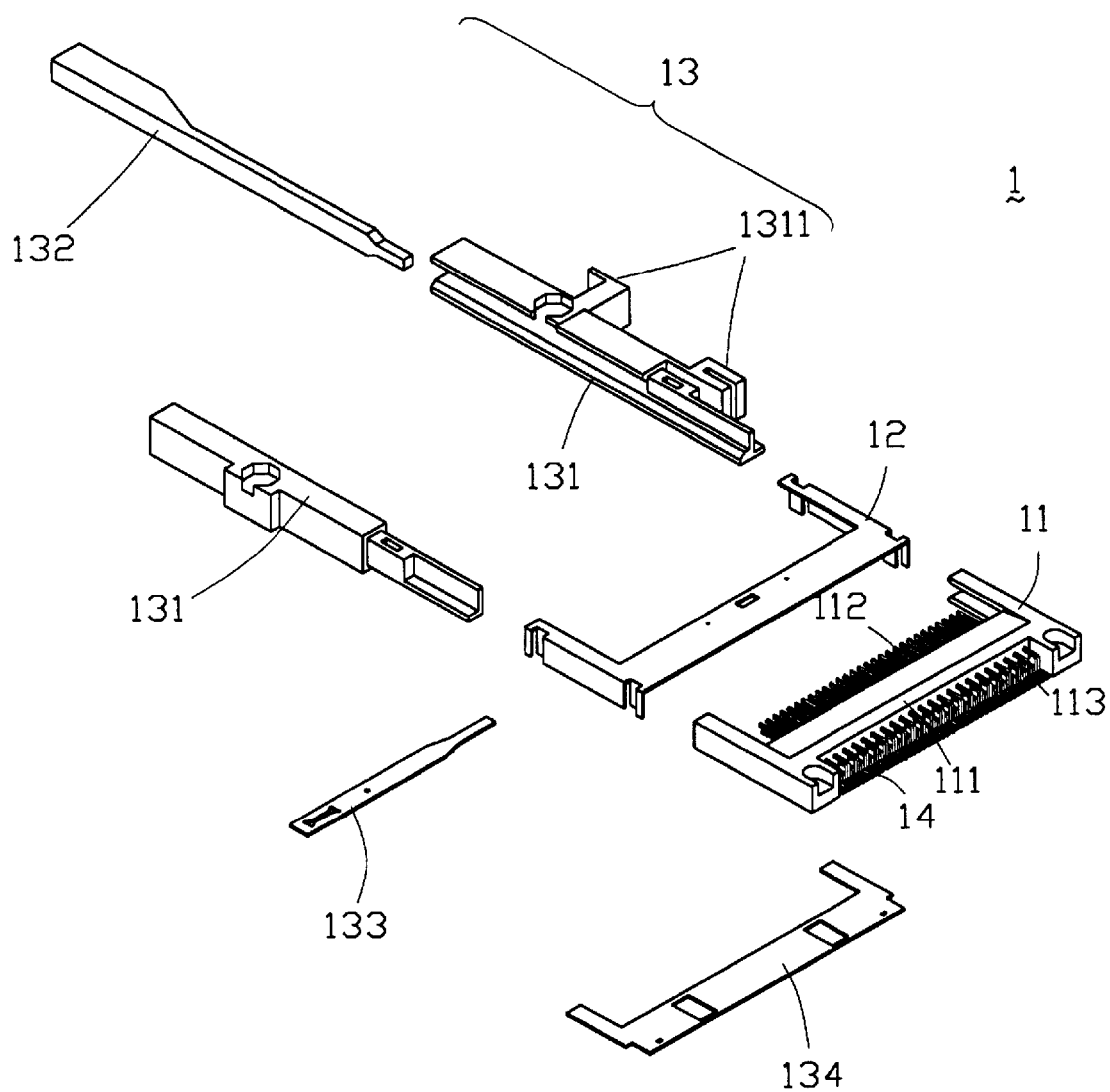
FIG. 1 is an exploded view of a prior art electronic card connector.
Figure 2:
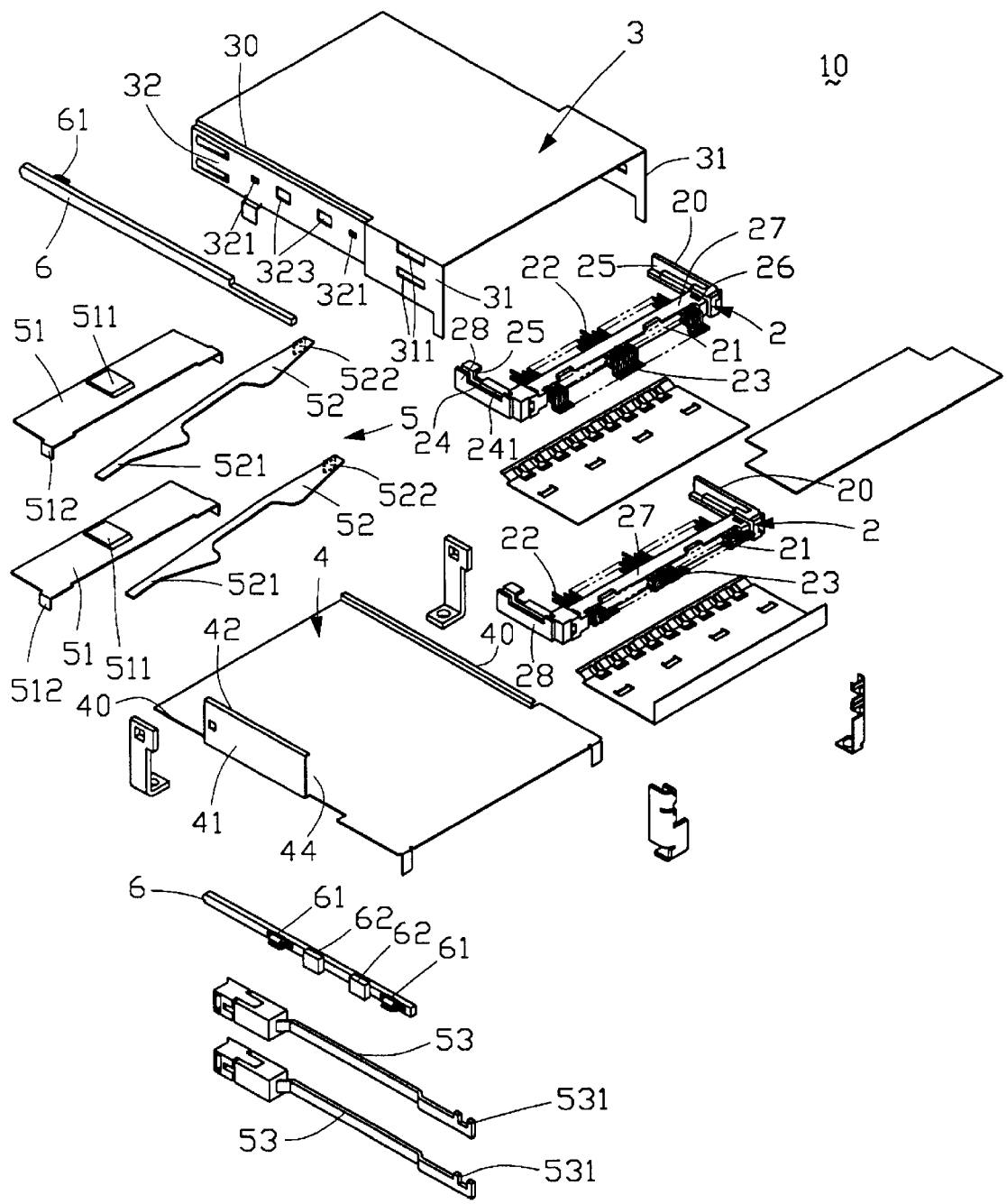
FIG. 2 is an exploded view of an electronic card connector constructed in accordance with the present invention.
Figure 3:
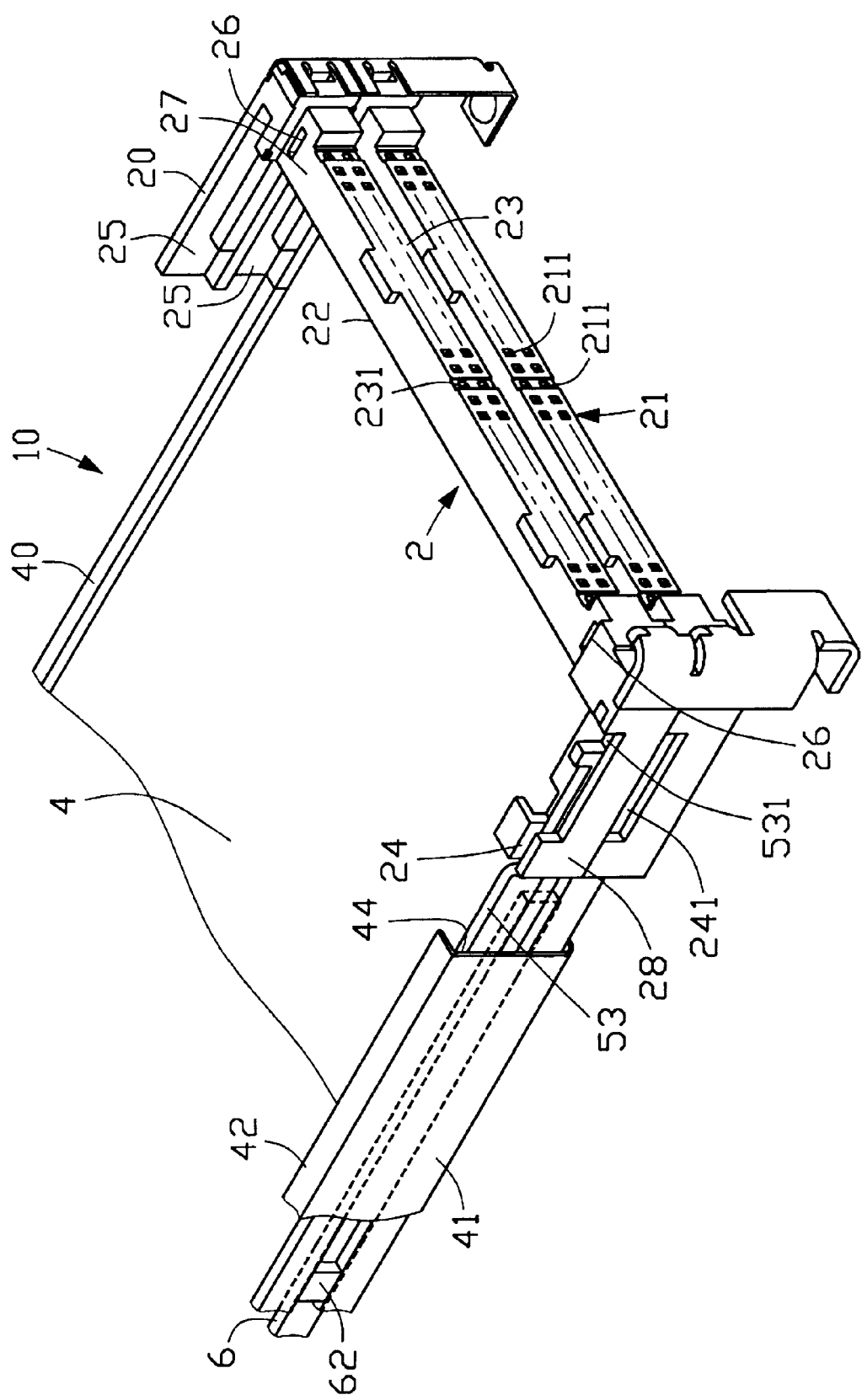
FIG. 3 is a perspective view of a portion of the electronic card connector of the present invention.

Referring to the drawings and in particular to FIGS. 2 and 3, wherein an electronic card connector constructed in accordance with the present invention, generally designated by reference numeral 10, is shown, the electronic card connector 10 has a dual-unit configuration, comprising two connector units (not labeled), each having an insulative header 2 retaining long and short contact terminals 15, 16 (FIG. 4) therein for electrically engaging with an electronic card (not shown) and a card release mechanism 5 for releasing the electronic card from the connector unit.

The header 2 comprises a U-shaped body having a central terminal receiving section 21 extending in a transverse direction and two arms 20, 28 longitudinally extending from opposite ends thereof for receiving the electronic card therebetween. Each arm 20, 28 of the U-shaped body of the header 2 defines a guide slot 25 for guiding the longitudinal movement of the electronic card with respect to the header 2.

The terminal receiving section 21 of the header 2 has a card facing side 22 and a board facing side 23. A plurality of terminal receiving channels 211 are defined in the central terminal receiving section 21 for receiving the contact terminals 15, 16. The channels 211 are defined between the card facing side 22 and the board facing side 23 of the header 2. Thus, leading ends 150, 151 and tail ends 160, 161 (FIG. 4) of the contact terminals 15, 16 respectively extend beyond the card facing side 22 and the board facing side 23 for electrically engaging the electronic card and mounting to a circuit board (not shown).

The headers 2 of the connector units are vertically stacked on each other. A casing comprising a lower casing member 4 attached to the underside of the header stack and an upper casing member 3 fit over the header stack encloses the headers 2 and the terminal contacts 15, 16. Ends of the casing are formed with front and rear openings, respectively. The front opening receives the electronic card while the rear opening exposes the ends 151, 161 of the contact terminals 15, 16 that are mounted to the circuit board.

The upper casing member 3 has two side panels fit over two sides of the headers 2. Each side panel comprises first and second side panel segments 31, 32 separated from each other in the longitudinal direction. The first side panel segment 31 corresponds to the arms 20, 28 of the headers 2 and defines two openings 311 therein.

The second side panel segment 32 defines at least one opening 321 therein for being engaged by corresponding barbs 61 formed on an elongate rail member 6 extending in the longitudinal direction, thereby attaching the rail member 6 to the side panel segment 32. The rail member 6 defines a slot (not labeled) with both the upper casing 3 and the lower casing 4. The slot constitutes an extension of the guide slot 25 of the corresponding arm 20, 28 of the header 2. Preferably, the lower casing member 4 and the upper casing member 3 are provided with transverse edge shoulders 40, 30 extending in the longitudinal direction and corresponding to the rail member 6 to define the extensions of the guide slots 25 of the upper and lower connector units with the rail member 6. The slots 25 guide electronic cards into the connector 1 to engage with the contact terminals 15, 16 of the headers 20.

The lower casing member 4 has a side plate 41 located outside the second side panel segment 32 of the upper casing member 3 and spaced therefrom. The side plate 41 has a U-shaped configuration facing inward. The side plate 41 has side flanges 42 defining a channel 44 for guidingly and movably receiving two card release bars 53 of the card release mechanisms 5 of the connector units.

The second side panel segment 32 has a plurality of openings 323 defined therein and the corresponding rail member 6 forms two blocks 62 thereon extending through the openings 323 and into the channel 44. The blocks 62 serve to separate the card release bars 53 from each other. The blocks 62 also define a passageway (not labeled) with each side flange 42 of the side plate 41 for receiving each card release bar 53. The card release bars 53 are guided to move longitudinally in the passageways.

The header 2 of each connector unit has a groove 241 defined in the arm 28 thereof corresponding to the side plate 41 of the lower casing member 4. The groove 241 guidingly receives a front end of each card release bar 53 therein. The groove 241 provides support to the front ends of the card release bars 53, while the passageways defined by the blocks 62 of the rail member 6 support rear sections of the card release bars 52. Thus, deflection of the card release bars 53 is prevented when the card release bars 53 are actuated to release electronic cards from the connector 10.

The card release mechanism 5 of each card connector unit comprises the card release bar 53 and an actuator 52. The actuator 52 has a first end 521 pivotably coupled to a front end of the card release bar 53 by being loosely received in a notch 531 defined therein and a second end 522 drivingly engageable with an electronic card for ejecting the electronic card from the connector.

Each header 2 has a recess 27 defined in a top face of the terminal receiving section 21 for accommodating an actuator support member 51 having two side tabs 512 fit into notches 26 defined in the recess 27. The actuator support member 51 defines a retaining slot 511 for receiving and pivotably supporting a central section of the actuator 52. By pushing the card release bar 53 longitudinally inward, the actuator 52 is pivoted by means of the coupling between the card release bar 53 and the first end 521 of the actuator 52 which in turn leads to a force being applied to an electronic card received in the connector 10 by means of the second end 522 of the actuator 52. Thus, the electronic card is ejected from the connector 10.

The arm 28 of the header 20 has a recess 24 defined therein for receiving the first end 521 of the actuator 52. The openings 311 of the first panel segment 31 are located corresponding to the recesses 24 of the headers 20 for accommodating a protrusion formed on the first end 521 of each actuator 52.

Figure 4:
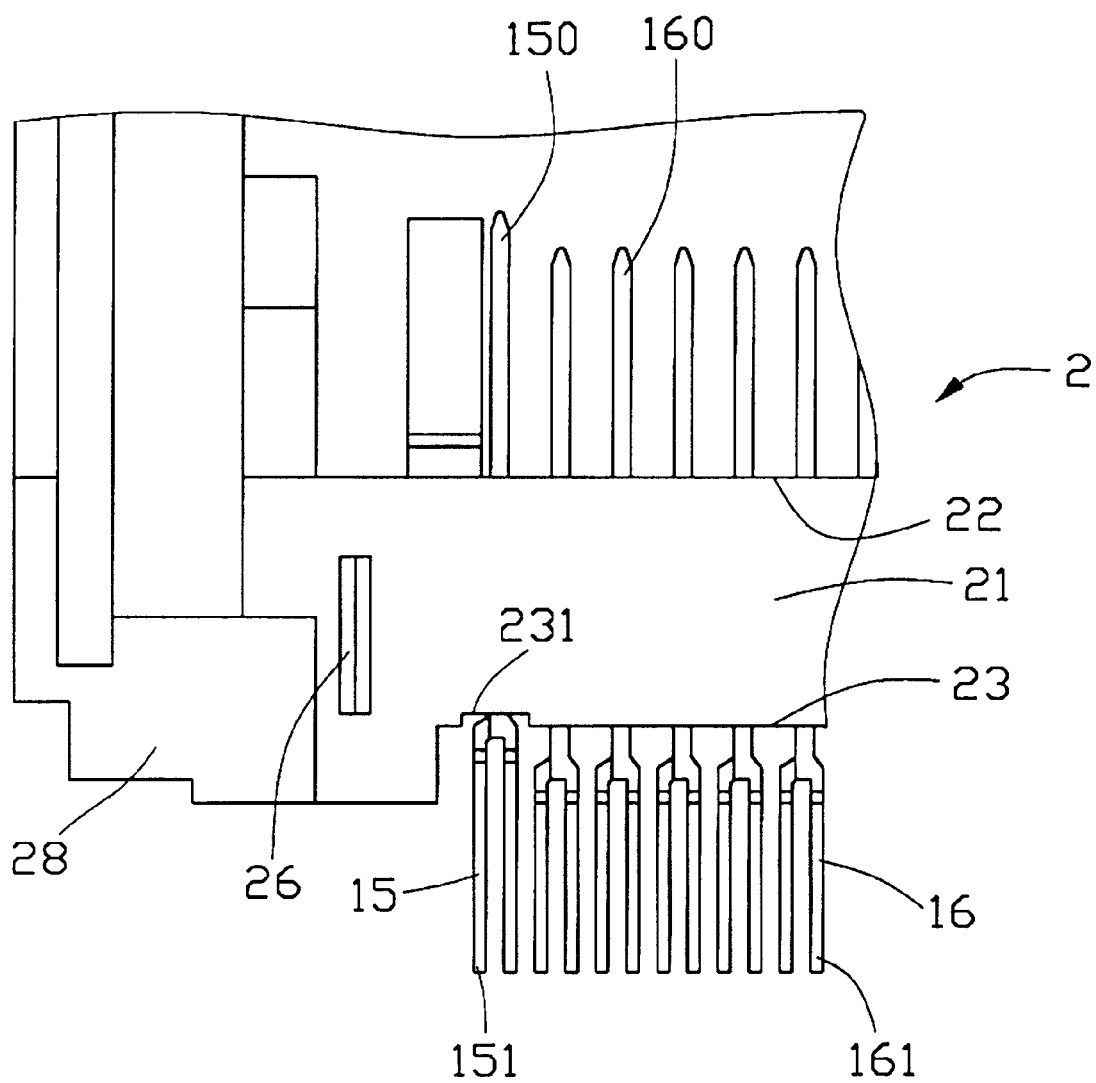
FIG. 4 is a top view of a portion of the electronic card connector of the present invention.

With reference to FIGS. 3 and 4, the terminal receiving section 21 retains long contact terminals 15 and short contact terminals 16 therein. The leading ends 150, 160 of the terminals 15, 16 extend beyond the card facing side 22 of the header 2 and the tail ends 151, 161 of the terminals 15, 16 extend beyond the board facing side 23. The board facing side 23 of the terminal receiving section 21 defines a plurality of recesses 231 of a predetermined depth located corresponding to the long contact terminals 15. The recesses 231 allow the tail ends 151, 161 of the contact terminals 15, 16 to be shifted into the connector 10 a distance corresponding to the recess depth thereby reducing the distance between the tail ends 151, 161 of the contact terminals 15, 16 and the board facing side 23. Thus, the overall dimension of the connector 10 is reduced.

Although the present invention has been described with reference to a preferred embodiment thereof, it is apparent to those skilled in the art that a variety of modifications and changes that may be made without departing from the scope of the present invention which is intended to be defined by the appended claims.

What is claimed is:

1. An electronic card connector comprising at least a first connector unit adapted to be mounted to a substrate for receiving and electrically connecting an electronic card to the substrate, the connector unit of the electronic card connector comprising:

an insulative header comprising a terminal receiving section extending in a transverse direction for receiving and retaining contact terminals therein, the contact terminals having tail ends electrically engaging the substrate and leading ends adapted to electrically engage with an electronic card received in the connector, an arm longitudinally extending from an end of the terminal receiving section, the arm defining a longitudinal groove therein;

a card release mechanism comprising an actuator pivotably supported on the header, having a card engaging end adapted to be drivingly engageable with an electronic card received in the connector and an actuated end opposite the card engaging end, a card release bar having a front end guidingly and movably received in the groove, the front end being mechanically coupled to the actuated end of the actuator whereby when the card release bar is moved longitudinally inward, the actuator is pivoted to drive the electronic card out of the connector via the card engaging end; and a casing enclosing the header, the casing comprising an inner side wall and an outer side wall on one side of the connector corresponding to the end of the terminal receiving section of the header from which the arm longitudinally extends, the inner and outer side walls defining a longitudinal channel therebetween for guiding a rear section of the card release bar.

2. The electronic card connector as claimed in claim 1, wherein the front end of the card release bar defines a notch for receiving the actuated end of the actuator.

3. An electronic card connector adapted to be mounted to a substrate for receiving and electrically connecting an electronic card to the substrate, the electronic card connector comprising an insulative header comprising a terminal receiving section extending in a transverse direction for receiving and retaining first and second contact terminals respectively having first and second lengths, the first length being longer than the second length, the terminal receiving section having a board facing side and a card facing side, the contact terminals extending in a longitudinal direction through the terminal receiving section and comprising tail ends extending beyond the board facing side for electrically engaging with the substrate and leading ends extending beyond the card facing side for electrically engaging with an electronic card received in the connector, the header defining a recess in the board facing side corresponding to each of the first contact terminals, the recess having a predetermined depth corresponding to a difference between the first and second lengths for accommodating the difference in length, thereby reducing an overall dimension of the electronic card connector.

4. An electronic card connector comprising at least a first connector unit adapted to be mounted to a substrate for receiving and electrically connecting an electronic card to the substrate, the first connector unit comprising:

an insulative header comprising a terminal receiving section extending in a transverse direction for receiving and retaining first and second contact terminals respectively having first and second lengths, the first length being longer than the second length, the contact terminals having tail ends extending beyond a board facing side of the terminal receiving section for electrically engaging with the substrate and leading ends adapted to electrically engage with an electronic card received in the connector, an arm longitudinally extending from an end of the terminal receiving section, the arm defining a longitudinal groove therein, the header defining a recess in the board facing side corresponding to each of the first contact terminals, the recess having a depth corresponding to a difference between the first and second lengths; and a card release mechanism comprising an actuator pivotably supported on the header having a card engaging end adapted to be drivingly engageable with an electronic card received in the connector and an actuated end opposite to the card engaging end, a card release bar having a front end guidingly and movably received in the groove, the front end being mechanically coupled to the actuated end of the rocking arm whereby when the card release bar in moved longitudinally inward, the actuator is pivoted to drive the electronic card out of the connector via the card engaging end.

5. The electronic card connector as claimed in claim 4 further comprising a casing enclosing the header, the casing comprising an inner side wall and an outer side wall at one side of the connector corresponding to the end of the terminal receiving section of the header from which the arm longitudinally extends, the inner and outer side walls defining a longitudinal channel therebetween for guiding a rear section of the card release bar.

6. The electronic card connector as claimed in claim 4, wherein the front end of the card release bar defines a notch for receiving the actuated end of the actuator therein.

* * * * *